United States Patent [19]

Ohtake et al.

[11] Patent Number: 5,356,703
[45] Date of Patent: Oct. 18, 1994

[54] CHEMICALLY ADSORBED FILM AND METHOD OF MANUFACTURING THE SAME

[75] Inventors: Tadashi Ohtake, Neyagawa; Norihisa Mino, Settu; Kazufumi Ogawa, Hirakata, all of Japan

[73] Assignee: Matsushita Electric Industrial Co., Ltd., Osaka, Japan

[21] Appl. No.: 912,688

[22] Filed: Jul. 13, 1992

[30] Foreign Application Priority Data

Jul. 17, 1991 [JP] Japan .................................. 3-176708
Jul. 17, 1991 [JP] Japan .................................. 3-176709

[51] Int. Cl.$^5$ ............................ B32B 7/04; B05D 1/36
[52] U.S. Cl. .................................. 428/245; 428/419; 428/420; 428/411.1; 428/288; 428/537.1; 428/537.5
[58] Field of Search ............ 428/411.1, 420, 288, 428/245, 419, 537.1, 537.5

[56] References Cited

U.S. PATENT DOCUMENTS 4,539,061  9/1985  Sagiv .................................. 156/278

Primary Examiner—P. C. Sluby
Attorney, Agent, or Firm—Fish & Richardson

[57] ABSTRACT

A chemically adsorbed monomolecular or a laminated monomolecular film comprising a monomolecular film formed on said substrate surface by covalent S-bonds is disclosed. For example, the covalent S-bond is selected of a group consisting of —(S=O)— and —(O=S=O)—. A method of producing a chemical adsorption film comprising; contacting a substrate containing hydroxl groups present on the surface with a non-aqueous solvent containing a material having a thionyl halide group or sulfuryl halide group; removing unreacted surface active material remaining on the substrate by washing the substrate with a non-aqueous organic solution for making monomolecular a precursor film; reacting unreacted surface active material remaining on the adsorbed monomolecular precursor film with water; and drying the adsorbed monomolecular film is also disclosed. Further, a method of producing a laminated chemical adsorption film comprising laminating a monomolecular adsorption film by repeating the above steps is disclosed.

5 Claims, 7 Drawing Sheets

1

CHEMICALLY ADSORBED FILM AND METHOD OF MANUFACTURING THE SAME

FIELD OF THE INVENTION

The present invention relates to a chemically adsorbed monomolecular film, a laminated chemically adsorbed monomolecular film, and methods of producing the films. Particularly, a chemically adsorbed film is bonded to a substrate surface by S-bonds, and a laminated chemical adsorbed film is formed through an accumulation of the chemical adsorbed layers by S-bonds.

BACKGROUND OF THE INVENTION

There are known techniques for producing a chemical adsorbed film, including a casting method and a spin coating method. The casting method comprises lifting up a glass plate after immersing in a dilute solution of polymer material, removing an excessive portion of the solution from the glass plate which is placed upright, separating a film of the remaining polymer from the glass plate which is immersed into water, and placing the film onto a substrate. The spin coating method comprises applying a dilute solution of a polymer material onto a substrate and removing an excessive portion of the solution by spinning the substrate at a high speed so that the remaining of the polymer solution can form a film. Each method can however develop a film of as large as hundreds of angstroms in thickness.

An organic monomolecular film producing method for developing a thinner film at a molecular level of thickness is also provided, e.g. the Langmuir-Blodgett's method or another chemical adsorption film producing method using a chlorosilane surface-active agent. In particular, two such chlorosilane surface-active agents using the chemical adsorption film producing methods are depicted in Jacob Sagiv's report in the "Journal of American Chemical Society", Vol.102, p.92, 1980, and the report by K. Ogawa et. al. in "Langmuir", Vol.6, p.851, 1990 respectively.

The Langmuir-Blodgett's method comprises developing on a gas/water interface molecules having at end hydrophilic groups, reducing the area of molecule development to a minimum, and transferring the minimum size of the molecules onto a given substrate. The molecules rest vertically to the gas/water interface with their hydrophilic groups on the water side. The development of the molecules can be reduced to a minimum by pressing from one side of the gas/water interface with a tooling termed as a barrier. As the result, the molecules are arranged at high density thus forming a monomolecular film on the gas/water interface. The monomolecular film is then bonded to a substrate forming a Langmuir-Blodgett film. Repeating the foregoing procedure, involves accumulation of monomolecular films.

The chlorosilane surface-active agent using the chemical adsorption film producing method forms a monomolecular film using the chemical reaction between chlorosilyl groups bonded to the end of straight-chain hydrocarbon molecules and hydroxyl groups exposed on the substrate surface for removal of hydrogen chloride.

The monomolecular film developed by the Langmuir-Blodgett's method appears to be bonded to the substrate by means of van der Waals or Coulomb's force. The bonding strength between the film and the substrate is thus low, causing removal or dissolution of the film itself during processing.

The chlorosilane surface-active agent using the chemical adsorption film producing method is provided for solving the problem of low bonding strength, in which the developed monomolecular film is bonded to a substrate by an Si—O covalent bond resulting from dehydrochlorination and can exhibit a higher bonding strength sufficient to resist after-processing. However, the chlorosilane surface-active agent or any adsorbent used in the method provide higher activation and thus, has to be utilized in a non-water atmosphere such as a dry nitrogen gas. Also, such adsorbents are costly and their action of chemical adsorption takes as long as one or more hours.

A conventional chemical adsorption accumulated film producing method using a chlorosilane surface-active agent is disclosed in the report by K. Ogawa et. al. in "Langmuir", Vol.6, p.851, 1990, which comprises developing a monomolecular film on a substrate with the use of straight-chain hydrocarbon molecules which have at one end chlorosilyl groups and at the other end unsaturated bonds and serve as adsorbents, modifying the unsaturated bonds and releasing active hydrogen atoms by emission of electron beams, and repeating the preceding procedure for film accumulation. This method involves the emission of electron beams and thus requires a considerable size of beam emitter facility which will provide an unwanted risk and may cause damage to the film.

SUMMARY OF THE INVENTION

It is an object of the present invention to provide a chemical adsorption film in which its molecules are chemically bonded by S-atoms to a substrate, an accumulated chemical adsorption film in which chemical adsorption films are accumulated and bonded to one another by S-bonds, and a method of producing the same in which each film can securely be developed with ease and within a short time as compared with the prior art methods.

According to a first aspect of the invention we provide a chemically adsorbed monomolecular film comprising a monomolecular film adsorbed to a substrate surface by covalent S-bonds.

It is preferable in this invention that the monomolecular film comprises a laminated film which is adsorbed to said monomolecular film by covalent S-bonds.

It is preferable in this invention that the substrate is selected from the group consisting of metals, ceramics, plastics, glass, semiconductors, papers, wood, and fibers.

It is preferable in this invention that the covalent bond is selected from the group consisting of—(S=O)— and —(O=S=O)—.

It is preferable in this invention that the S-bonds are selected from the group consisting of A—(S=O)— and A—(O=S=O)— (where A represents alkyl, alkylene, alkoxyl, or a substituted group).

According to a second aspect of the invention we provide a method of producing a chemical adsorption film comprising bonding molecules having at one end a halosulfinyl group of the formula—(S=O)— or a halosulfonyl group of the formula —(O=S=O)—X to a substrate having active hydrogen atoms by contacting the molecules with the substrate to react the halosulfinyl or halosulfonyl groups in the molecules with the hydrogen atoms in the substrate wherein X in both formulas is a halogen.

It is preferable in this invention that the chemical adsorption film is reacted with a chemical adsorbent having at least at one end a functional group selected from the group consisting of —(S=O)—X and —(O=S=O)—X, wherein X in both formulas is a halogen.

It is preferable in this invention that the molecules are of thionyl halide (SOX$_2$, where X is a halogen) or sulfuryl halide (SO$_2$X$_2$, where X is a halogen).

According to a third aspect of the invention we provide a method of producing a chemical adsorption film comprising;

(A) contacting a substrate containing hydroxl groups present at the substrate surface with a non-aqueous solvent containing a material having a thionyl halide group or sulfuryl halide group;

(B) removing unreacted surface active material remaining on the substrate surface by washing the substrate with a non-aqueous organic solution to form an adsorbed monomolecular precursor film;

(C) reacting unreacted surface active material remaining on the adsorbed monomolecular precursor film with water and (D) drying the adsorbed monomolecular film.

According to a fourth aspect of the invention we provide a method of producing a laminated chemical adsorption film comprising;

(A) contacting a substrate containing hydroxl groups present at the substrate surface with a non-aqueous solvent containing a material having a thionyl halide group or sulfuryl halide group;

(B) removing unreacted surface active material remaining on the substrate surface by washing the substrate with a non-aqueous organic solution to form an adsorbed monomolecular precursor film;

(C) reacting unreacted surface active material remaining on the adsorbed monomolecular precursor film with water;

(D) drying the adsorbed monomolecular film;

(E) repeating steps (A) to (D) to form the laminated chemical adsorption film.

According to the invention, the chemical adsorption film and the accumulated chemical adsorption film are produced by contacting the molecules having at one end a halosulfinyl or halosulfonyl group to the substrate or to the existing chemical adsorption film having active hydrogen atoms or the molecules having active hydrogen atoms to the substrate or existing chemical adsorption film having a halosulfinyl or halosulfonyl group to cause a dehydrochlorination reaction As a result, S—Z covalent bonds (where Z is selected from O, C, S, and N atoms) are developed on the surface of the substrate or existing film, thus allowing the molecules to be securely bonded to the substrate or existing film.

The S—Z bond is greater in covalent bonding strength than an Si—O bond produced by conventional chemical adsorption methods using a chlorosilance surface-active agent so that the chemical adsorption film and accumulated chemical adsorption film according to the present invention exhibits a higher bonding strength to the substrate or between its accumulation films than that of the conventional methods.

DETAILED DESCRIPTION OF THE INVENTION

Figure 1:
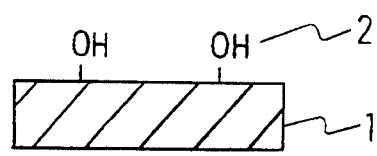
FIG. 1 is an enlarged sectional view of the surface of a substrate according to one embodiment of the present invention.

A chemical adsorption film according to the present invention is chemically bonded by S-bonds to a substrate. Also, a chemical adsorption accumulated film of the present invention is formed by accumulation of chemical adsorption layers through S-bonds. It is however, assumed that the chemical adsorption film designated in this embodiment represents a newly accumulated layer of film.

An adsorbent used for producing chemical adsorption films of the present invention is selected from a halosulfinyl group (—SOX, where X is halogen) and a halosulfonyl group molecule (—SO$_2$X, where X is halogen), thionyl halide, and sulfuryl halide. The substrate is provided having active hydrogen atoms on its surface.

In particular, the adsorbent may be a molecule in which a hydrocarbon chain is bonded at one end with a halosulfinyl or halosulfonyl group, or a hydrocarbon chain containing an aromatic ring, a heterocyclic form, and metals are bonded at one end with a halosulfinyl or halosulfonyl group. The substrate may be a piece of glass, rubber, fiber, paper, oxide coated metal, wood, or other material having active hydrogen atoms. In common, the active hydrogen atoms are found in a hydroxyl, carboxyl, amino, imino, sulfonate, sulfinate, or thiol group. Also, the active hydrogen atoms are found bonding to alpha carbons of an ester group, e.g. nitrate, nitrite, sulfate, or sulfite, aldehyde group, carbonyl group, nitryl group, nitro group, nitroso group, or nitfamine group. Hydrogen atoms which are bonded to three carbons of an alkene or to alpha carbons in an aromatic ring of an aromatic substituent may be utilized. Any other substrate may be used having such a functional group.

When the adsorbent of the present invention comes into contact with any of the substrates, halogen atoms in the adsorbent react with active hydrogen atoms in the substrate to form hydrogen halide which is then eliminated (a dehydrohalogenation reaction). Hence, the adsorbent is bonded by a covalent S-bond to the substrate, thus yielding a chemical adsorption film.

Two different methods of producing an accumulated chemical adsorption film according to the present invention are known. One allows an adsorbent containing a halosulfinyl or a halosulfonyl group to react with active hydrogen atoms on the substrate, and the other allows an adsorbent containing active hydrogen atoms to react with a halosulfinyl or a halosulfonyl group on the substrate. As a result, the halosulfinyl or halosulfonyl group reacts with the active hydrogen atoms to form hydrogen halide and an S—Z bond (where Z is an atom selected from O, C, S, and N) is established through covalent bonding action. Accordingly, an accumulated chemical adsorption film is developed by bonding molecules to each other through S-bonds and repeating the procedure for accumulation.

The film in the embodiment is classified as a Langmuir-Blodgett film, a chemical adsorption film, an accumulated chemical adsorption accumulated film, or any other film produced on a substrate by a known casting or spin coating technique. More specifically, the chemical adsorption or accumulated chemical adsorption film is preferred because they can be handled with much ease during contact.

The active hydrogen atoms in the embodiment are preferably selected from those described above.

The chemical adsorption or accumulated chemical adsorption film tends to be an accumulated chemical adsorption monomolecular film after rinsing, in which the remaining or unreacted portion of the adsorbent is removed. In practice, the accumulated monomolecular film will exhibit better properties and become extremely useful.

The halogen compound in the embodiment can be Cl, Br, or I. For high reactivity, Cl is most preferred. Also, Br or I will be used successfully for producing a chemical adsorption film or an accumulated chemical adsorption film through an S-bond.

Chemical adsorption for contacting and bonding the chemical adsorption film to the substrate or existing adsorption film is carried out by a liquid or gas phase technique. The liquid phase adsorption is more advantageous in the density of adsorption molecules and the operability. However, the liquid phase technique will increase the fusing point from 80° C. to over 90° C. when the number of carbon atoms in an alkyl group of the adsorbent is more than 25. The adsorbent is preferably provided in a solution containing a nonaqueous solvent, e.g. hexadecane or chloroform. Also, a specific adsorbent which is preferred to be used in liquid, may be used by dissolving in a nonaqueous solvent.

The chlorosilane surface-active agent employed in a known chemical adsorption method is highly reactive to active hydrogen atoms of Si—Cl bonds of the chlorosilyl group so that it can quickly react but is hard to handle. The adsorbent in the preferred embodiment is low in reactivity but high in compliance, compared with the chlorosilane surface-active agent. The reactivity may be increased by using a higher reacting temperature. The reacting temperature should be in a range which is less than the fusing point and causes no injury in the substrate or existing adsorption film. As the reacting temperature increases, the adsorbent will react more with water in ambient air. A hydrogenous product resulting from reaction with the water is reduced in the molecular weight about 37 and becomes hydrophilic, moving away from an organic layer, thus being found at a higher or exposed region to the air. Hence, the chemical adsorption action of the chemical adsorption film will hardly be affected by such byproducts.

The covalent S-bonds formed through dehydrohalogenation is higher in bonding strength than Si—O bonds produced by the conventional chemical adsorption method with a chlorosilane surface-active agent. The covalent S-bond is expressed as S'O, S—N, S—C, or S—S in which a difference in negative charge between the atoms is small and thus, their covalent bonding strength becomes high. However, the Si—O bond depends largely on ionic bonds because the difference in negative charge between Si and O is as high as 1.7 (of poling rate). It is known that when the poling rate is more than 1.7, the ionic bonds are involved to a greater degree than covalent bonds.

Also, S=O or O=S=O in each molecule of the film has S and O atoms polarized and thus, the coulomb force is developed between two adjacent molecules so that the bond distance between the molecules can be increased.

For producing an accumulated chemical adsorption film of the present invention, the chemical adsorbent having a halosulfinyl or halosulfonyl group is preferably thionyl halide (SOX$_2$, where X is halogen) or sulfuryl halide (SO$_2$X$_2$, where X is halogen). As the result, active halogen atoms are released on a finished accumulated chemical adsorption film and will thus react with hydrogen atoms of the adsorbent to develop another layer of the chemical adsorption film over the preceding film. Also, such active hydrogen atoms can be produced on the accumulated chemical adsorption film by applying water for rinsing, which then react with the chemical adsorbent having a halosulfinyl or halosulfonyl group to yield a new layer of film for accumulation.

For accumulating layers of chemical adsorption film on the existing accumulated chemical adsorption film having the halosulfinyl or halosulfonyl groups, the chemical adsorbent containing active hydrogen atoms is preferably a common compound having a carbonyl or amino group. The resultant covalent bonds in the film are higher in bonding strength than the Si—O bond produced by the conventional chemical adsorption method with a chlorosilane surface-active agent. The covalent S-bond is expressed as S—O, S—N, S—C, or S—S in which a difference in negative charge between the atoms is small and thus, their covalent bonding strength becomes high. On the contrary, the Si—O bond largely depends on ionic bonds because the difference in negative charge between Si and O is as high as 1.7 (of poling rate). It is known that when the poling rate is more than 1.7, ionic bonds are involved greater than covalent bonds.

When some hydrogen atoms of the alkyl groups of the adsorbent are replaced with fluorine atoms, a resultant adsorption film exhibits water- and oil-repellency. If an unsaturated bond, e.g. C═C, is developed, the adsorption film can be increased in rigidity by polymerization. If such unsaturated bonds include C═C, the adsorption film can be increased in conductivity by the polymerization. Due to the presence of the alkyl group, the chemical adsorption film will exhibit a variety of desirable properties.

According to the present invention, a chemical adsorption film is chemically bonded by S-bonds to a substrate or existing adsorption film so that covalent bonds can be increased in bonding strength compared with that of conventional chemical adsorption methods using a chlorosilane surface-active agent. Also, the procedure of chemical adsorption according to the present invention takes a shorter period of time and also, becomes less affected by water existing in the adsorption atmosphere. As a the result, both the production of a chemical adsorption film and the accumulation of such chemical adsorption films will be executed with much ease. Also, the chemical adsorbent used in the method of the present invention is widely available at a lower cost than the chlorosilane surface-action agent of a conventional method.

The chemical adsorption film and its method of producing the present invention will now be described in more detail.

EXAMPLE 1

As shown in FIG. 1, a glass plate 1 was used as the hydrophilic substrate. The glass plate 1 was cleaned with an organic solution and dried out, and was dipped and held for 3 minutes in a bath of thionyl chloride which was at 40° C. in ambient air. As the result, the S—Cl group in thionyl chloride reacted with a hydroxyl group 2 on the glass plate 1 causing dehydrochlorination. A resultant chemical adsorption film developed on the glass plate 1 contained a specific bond shown in Structural Formula 1.

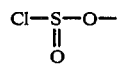 [Formula 1]

Figure 2:
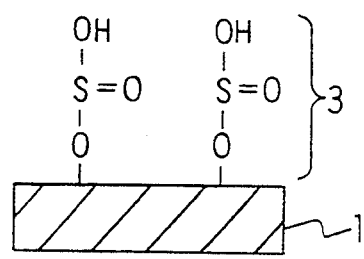
FIG. 2 is an enlarged sectional view of a chemical adsorption film according to the embodiment of the present invention.

Then, the film on the glass plate 1 was washed with a nonaqueous chloroform solution for 3 minutes and with water for 3 minutes. The chemical film on the glass plate 1 was shifted from Formula 1 to Formula 2, thus yielding a chemical adsorption monomolecular film 3 having at its surface a hydroxyl group as shown in FIG. 2. The monomolecular film 3 was securely bonded to the glass plate 1 and found to be highly hydrophilic.

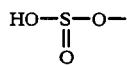 [Formula 2]

Figure 3:
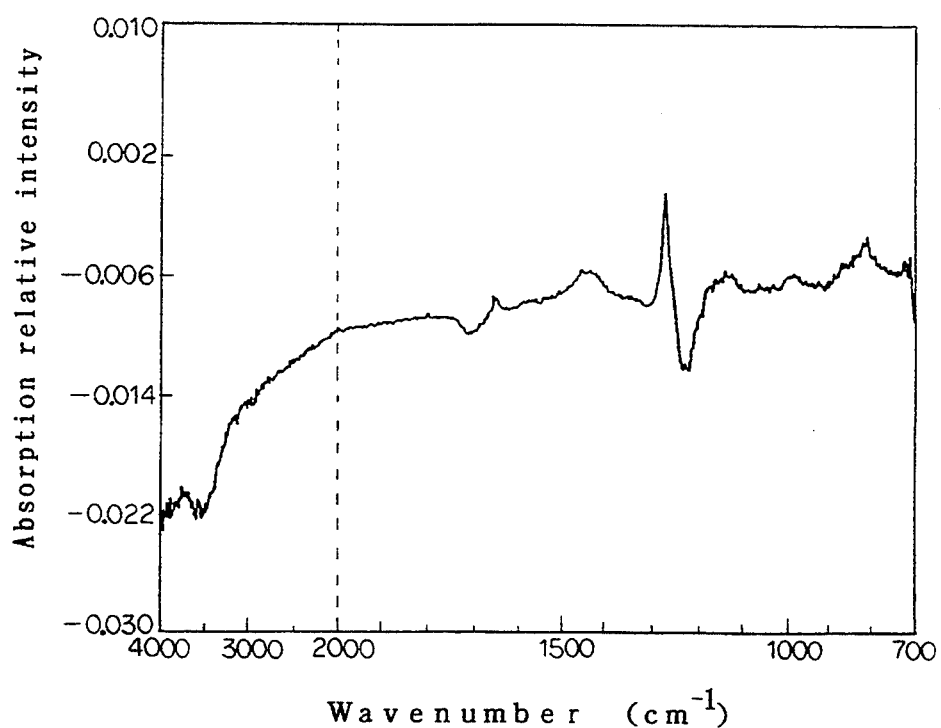
FIG. 3 is a diagram showing a Fourier transform infrared adsorption spectrum of the chemical adoption film of the embodiment the present invention.

FIG. 3 shows a Fourier transformation infrared adsorption spectrum (FT-IR) of the monomolecular film 3 in which a waveform exhibits the desired characteristics at 3750 cm$^{-1}$ (attributed to O—H), 1440 cm$^{-1}$ (attributed to S—O), and 1240 cm$^{-1}$ (attributed to S═O). Also, the immersing time of the glass plate 1 in thionyl chloride was varied and FT-IR was measured. As a result, no change in the spectrum was found. This indicates that the chemical adsorbent of Example 1 completely reacted with the hydroxyl group 2 of the glass plate 1 or performed saturated adsorption during the 3-minute immersion.

EXAMPLE 2

A glass plate 2 identical to that of Example 1 was used as the hydrophilic substrate. The glass plate 1 was cleaned with an organic solution and dried out, and was dipped and held for 3 minutes in a bath of sulfuryl chloride which was at 40° C. in ambient air. As a result, the S—Cl group in the sulfuryl chloride reacted with a hydroxyl group 2 in the glass plate 1 causing dehydrochlorination. A resultant chemical adsorption film developed on the glass plate 1 contained a specific bond shown in Structural Formula 3.

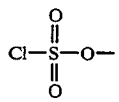 [Formula 3]

Figure 4:
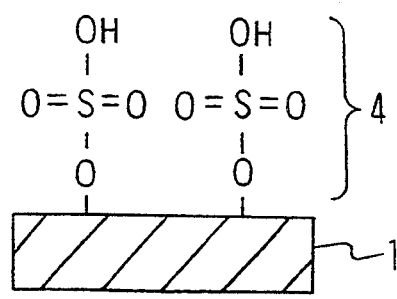
FIG. 4 is an enlarged sectional view of a chemical adsorption film according to the embodiment of the present invention.

The film on the glass plate 1 was washed with a nonaqueous chloroform solution for 3 minutes and with water for 3 minutes as in Example 1. The chemical film on the glass plate 1 was shifted from Formula 3 to Formula 4, thus yielding a chemical adsorption monomolecular film 4 having at its surface a hydroxyl group as shown in FIG. 4. The monomolecular film 4 was securely bonded to the glass plate 1 and found to be highly hydrophilic.

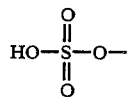 [Formula 4]

Figure 5:
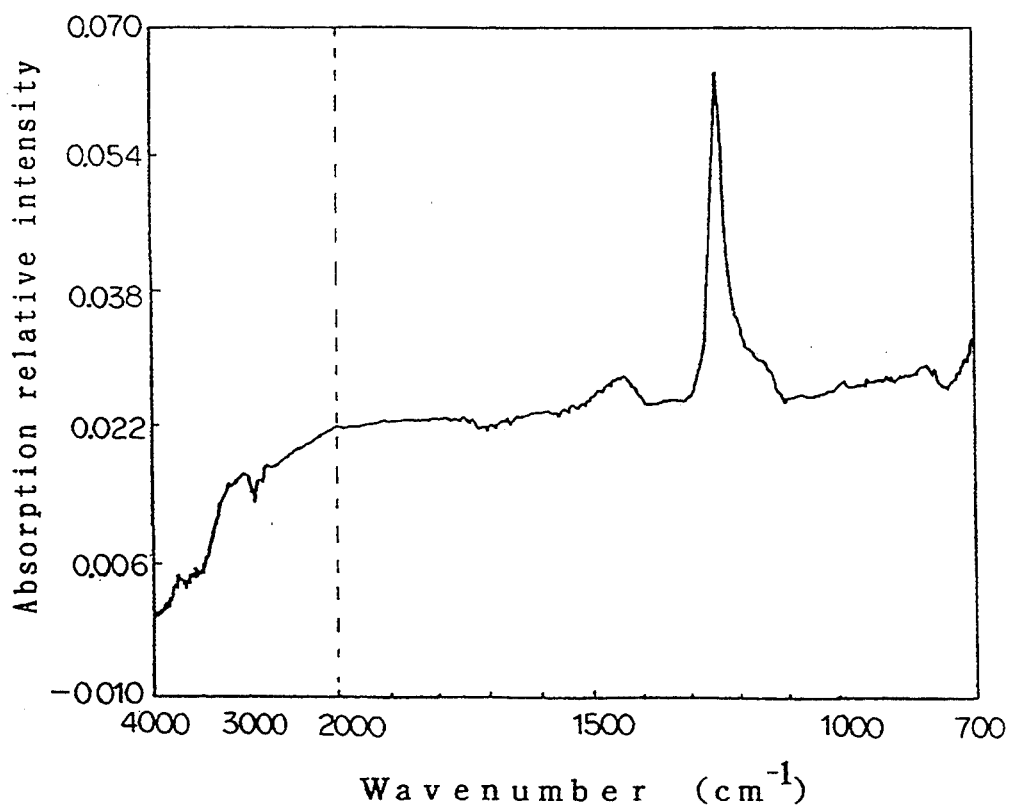
FIG. 5 is a diagram showing a Fourier transform infrared adsorption spectrum of the chemical adoption film of the embodiment the present invention.

FIG. 5 shows a Fourier transformation infrared adsorption spectrum of the monomolecular film 4 in which a waveform exhibits the desired characteristics at 3750 cm$^{-1}$ (attributed to O—H), 1440 cm$^{-1}$ (attributed to S—O), and 1240 cm$^{-1}$ (attributed to O═S═O). The saturated adsorption in Example 2 was also completed in 3 minutes.

EXAMPLE 3

A glass plate 1 identical to that of Example 1 was used as the hydrophilic substrate. The glass plate 1 was cleaned with an organic solution and dried out, and was dipped and held for 3 minutes in a bath of 10% by weight of chloroform solution containing ethanesulfonyl chloride (CH₃CH₂SO₂Cl) which was at 40° C. in ambient air. As the result, the S—Cl group in the ethanesulfonyl chloride reacted with a hydroxyl group 2 in the glass plate 1 causing dehydrochlorination. A resultant chemical adsorption film developed on the glass plate 1 contained a specific bond shown in Structural Formula 5.

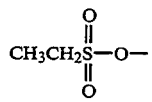  [Formula 5]

Figure 6:
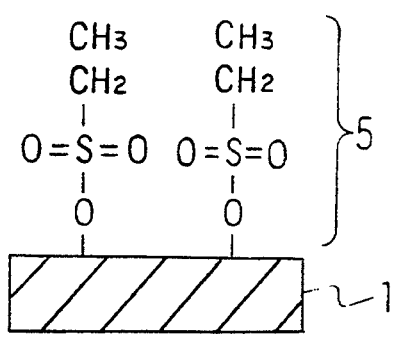
FIG. 6 is an enlarged sectional view of a chemical adsorption film according to the embodiment of the present invention.

Then, the film on the glass plate 1 was washed with a nonaqueous chloroform solution for 3 minutes and with water for 3 minutes as in Example 1. The chemical film on the glass plate 1 was found in the form of a chemical adsorption monomolecular film 5 extending throughout the surface as shown in FIG. 6. The monomolecular film 5 was securely bonded to the glass plate 1 and found to be highly hydrophilic.

A Fourier transformation infrared adsorption spectrum of the monomolecular film 4 was measured in which a waveform exhibits desired characteristics at 2960 to 2840 cm$^{-1}$ (attributed to CH₃, —CH₂—), 1470 cm$^{-1}$ (attributed to —CH₂—), and 1240 cm$^{-1}$ (attributed to S—O, O=S=O). The saturated adsorption in Example 3 was also completed in 3 minutes.

For comparison, the glass plate 1 of Example 3 was immersed in a bath of 10% by weight of a solution prepared by dissolving a known chlorosilane surface-active agent into a mixture of a solvent containing hexadecane and chloroform at a weight ratio of 4:1, which was at 40° C. in a dry nitrogen atmosphere. Adsorption, however, took about one hour. A finished adsorption film was measured by the FT-IR procedure and found similar to those in Examples 1 to 3. It is now understood that the chemical adsorption film of the present invention is 20 times greater in the rate of adsorption than the conventional adsorption film. Also, the chemical adsorption according to the present invention can be executed in the atmosphere of ordinary air. The chlorosilane surface-active agent of the traditional method tends to react with water in ambient air thus disturbing the development of a chemical adsorption film.

The two different chemical adsorption films produced by the method of the present invention using CH₃CH₂SO₂Cl and the conventional method using CH₃CH₂SiCl₃ respectively were heated in a dryer box and then, cooled down to room temperature. Then, the resultant films were examined by Fourier transform infrared adsorption spectrum analysis for exfoliation. The traditional adsorption film produced from CH₃CH₂SiCl₃ started exfoliation at 18° C. and was eliminated completely at 23° C.

The improved adsorption film of the present invention was completely eliminated only when the temperature was as high as 25° C. after starting exfoliation at 20° C. It was found that the chemical adsorption film of the present invention is much improved in its resistance to heat as compared with the traditional film. This advantage results from the bonding strength of S atoms between the chemical adsorption film and the substrate.

The glass substrate may be replaced by paper, fiber, or oxide coated metal with equal success. Although the chemical adsorbent of the Examples contains a lower alkyl group for the substitution reaction, it is not limiting and long chain, unsaturated, fluorine containing, or other alkyl groups can be used.

The production of the accumulated chemical adsorption film according the present invention will now be described.

EXAMPLE 4

The chemical adsorption monomolecular film 3 produced in Example 1 was used to make an accumulated chemical adsorption film.

The production of the accumulated chemical adsorption film was carried out in the following manner. The glass plate 1 carrying the chemical adsorption monomolecular film 3 was dipped and held for 3 minutes in a bath of thionyl chloride which was at 40° C. in ambient air. As the result, the Cl atoms of the S—Cl groups of thioyl chloride reacted with the hydrogen atoms of the O—H groups in the chemical adsorption monomolecular film 3 causing dehydrochlorination. A resultant chemical adsorption film, expressed by Structural Formula 6, was accumulated over the existing chemical adsorption monomolecular film 3.

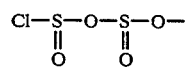  [Formula 6]

Figure 7:
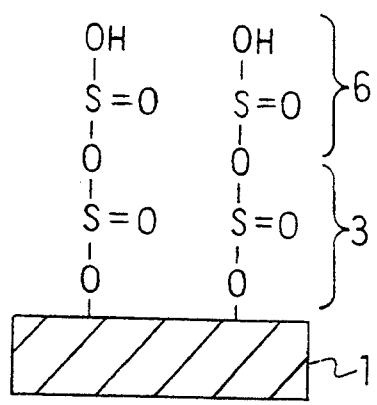
FIG. 7 is an enlarged sectional view of a chemical adsorption laminated film according to the embodiment of the present invention.

Then, the accumulated film was washed with chloroform for 3 minutes and with water for 3 minutes. Accordingly, the film was shifted from Formula 6 to Formula 7, thus yielding a chemical adsorption film 6 having at its surface a hydroxyl group as shown in FIG. 7. The accumulated film 6 was securely bonded with the existing chemical adsorption film 3 and found to be highly hydrophilic.

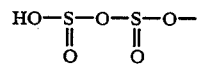  [Formula 7]

The accumulated film was examined by FT-IR spectrum analysis and it was found that the strength of absorption is doubled at two wavelength points of 1440 and 1240 cm$^{-1}$. Also, after the chemical adsorption monomolecular film 3 was immersed in the thionyl chloride for a different time, its resultant accumulated film was measured by FT-IR technique and found that no change in the spectrum strength is caused by varying the immersion time. Accordingly, it is proved that the chemical adsorbent of Example 4 completely reacted with the hydroxyl group 2 in the chemical adsorption monomolecular film 3 within 3 minutes thus resulting in a complete saturated adsorption.

EXAMPLE 5

Like Example 4, the chemical adsorption monomolecular film 3 produced in Example 1 was used to make an accumulated chemical adsorption film.

The production of the accumulated chemical adsorption film was carried out in the following manner. The glass plate 1 carrying the chemical adsorption monomolecular film 3 was dipped and held for 3 minutes in a bath of sulfuryl chloride which was at 40° C. in ambient air. As a result, the Cl atoms of the S—Cl group of the sulfuryl chloride reacted with the hydrogen atoms of the O—H groups in the chemical adsorption monomolecular film 3 causing dehydrochlorination. A resultant chemical adsorption film expressed by Structural Formula 8 was accumulated over the existing chemical adsorption monomolecular film 3.

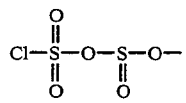
[Formula 8]

Figure 8:
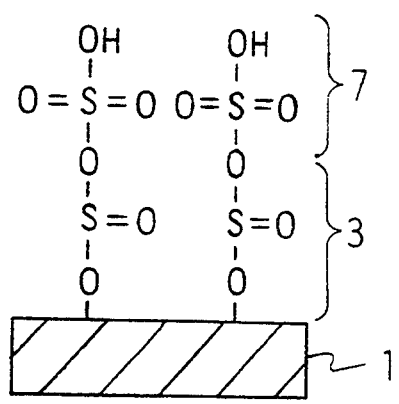
FIG. 8 is an enlarged sectional view of a chemical adsorpti n laminated film according to the embodiment of the present invention.

Then, the accumulated film was washed with chloroform for 3 minutes and with water for 3 minutes. Accordingly, the film was shifted from Formula 8 to Formula 9, thus yielding an accumulated chemical adsorption film 7 having at its surface a hydroxyl group as shown in FIG. 8. The accumulated film 7 was securely bonded with the existing chemical adsorption film 3 and found to be highly hydrophilic.

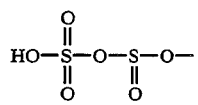
[Formula 9]

The accumulated film was examined by FT-IR spectrum analysis and found that its strength of adsorption is doubled at two wavelength points of 1440 and 1240 cm$^{-1}$. Also, the duration of saturated adsorption in Example 5 was examined and found that saturated adsorption was achieved in 3 minutes.

EXAMPLE 6

Like Example 4, the chemical adsorption monomolecular film 3 produced in Example 1 was used to make an accumulated chemical adsorption film. The production of an accumulated chemical adsorption film was carried out in the following manner. The glass plate 1 carrying the chemical adsorption monomolecular film 3 was dipped and held for 10 minutes in a bath of ethanesulfinyl chloride which was at 40° C. in ambient air. As a result, the Cl atoms of the S—Cl groups in the ethanesulfinyl chloride reacted with the hydrogen atoms of the O—H groups in the chemical adsorption monomolecular film 3 causing dehydrochlorination. A resultant chemical adsorption film expressed by Structural Formula 10 was accumulated over the existing chemical adsorption monomolecular film 3.

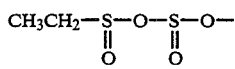
[Formula 10]

Figure 9:
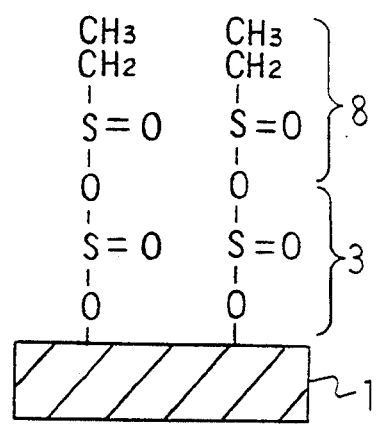
FIG. 9 is an enlarged sectional view of a chemical adsorption laminated film according to the embodiment of the present invention.

The accumulated film was washed with chloroform for 3 minutes and with water for 3 minutes. Accordingly, the remaining or unreacted portion of ethanesulfinyl chloride was removed and the resultant chemical adsorption film 8 expressed by Structural Formula 11 was accumulated over the existing chemical adsorption monomolecular film 3 as shown in FIG. 9. The accumulated film 8 was securely bonded with the existing chemical adsorption film 3 and found to be highly hydrophilic.

The accumulated film was examined by FT-IR spectrum analysis and it was found that its strength of absorption is doubled at two wavelength points of 1440 and 1240 cm$^{-1}$. Also, the strength becomes nil at 3750 cm$^{-1}$ (attributed to O—H) but prominent about 2900 cm$^{-1}$ representing the existence of an alkyl group, so that accumulation is proved. Similar to Example 1, the duration for saturated adsorption in Example 6 was also examined and found that the saturated adsorption was achieved in 10 minutes.

EXAMPLE 7

The chemical adsorption monomolecular film 4 produced in Example 2 was used to make an accumulated chemical adsorption film.

The production the accumulated chemical adsorption film was carried out in the following manner. The glass plate 1 carrying the chemical adsorption monomolecular film 4 was dipped and held for 10 minutes in a bath of thionyl chloride which was at 40° C. in ambient air. As the result, the Cl atoms of the S—Cl groups in the thionyl chloride reacted with the hydrogen atoms of the O—H groups in the chemical adsorption monomolecular film 4 causing dehydrochlorination. A resultant chemical adsorption film expressed by Structural Formula 11 was accumulated over the existing chemical adsorption monomolecular film 4.

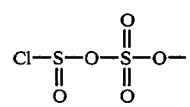
[Formula 11]

Figure 10:
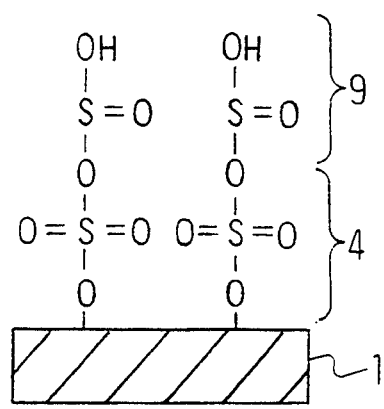
FIG. 10 is an enlarged sectional view of a chemical adsorption laminated film according to the embodiment of the present invention.

Then, the accumulated film was washed with chloroform for 3 minutes and with water for 3 minutes. Accordingly, the film was shifted from Formula 11 to Formula 12, thus yielding an accumulated chemical adsorption film 9 having at its surface hydroxyl groups as shown in FIG. 10. The accumulated film 9 was securely bonded with the existing chemical adsorption film 4 and found to be highly hydrophilic.

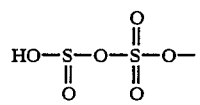
[Formula 12]

The accumulated film was examined by FT-IR spectrum analysis and it was found that its strength of absorption is doubled at two wavelength points of 1440 and 1240 cm$^{-1}$. Also, the duration of saturated adsorption in Example 7 was examined and it was found that saturated adsorption was achieved in 10 minutes.

EXAMPLE 8

Like Example 7, the chemical adsorption monomolecular film 4 produced in Example 2 was used to make an accumulated chemical adsorption accumulated film. The production of the accumulated chemical adsorption film was carried out in the following manner. The glass plate 1 carrying the chemical adsorption monomolecular film 4 was dipped and held for 3 minutes in a bath of sulfuryl chloride which was at 40° C. in ambient air. As a result, the Cl atoms of the S—Cl groups in the sulfuryl chloride reacted with the hydrogen atoms of the O—H groups in the chemical adsorption monomolecular film 4 causing dehydrochlorination. A resultant chemical adsorption film expressed by Structural Formula 13 was accumulated over the existing chemical adsorption monomolecular film 4.

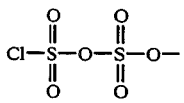

[Formula 13]

Figure 11:
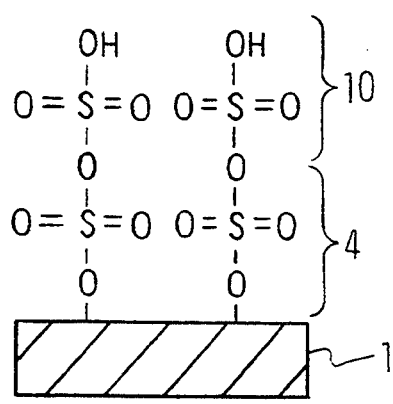
FIG. 11 is an enlarged sectional view of a chemical adsorption laminated film according to the embodiment of the present invention.

The accumulated film was washed with chloroform for 3 minutes and with water for 3 minutes. Accordingly, the film was shifted from Formula 13 to Formula 14, thus yielding an accumulated chemical adsorption film 10 having at its surface hydroxyl groups as shown in FIG. 11. The accumulated film 10 was securely bonded with the existing chemical adsorption film 4 and found to be highly hydrophilic.

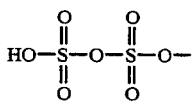

[Formula 14]

The accumulated film was examined by FT-IR spectrum analysis and it was found that its strength of adsorption is doubled at two wavelength points of 1440 and 1240 cm$^{-1}$. Also, the duration of saturated adsorption in Example 8 was examined and found that the saturated adsorption was achieved in 3 minutes.

EXAMPLE 9

The chemical adsorption monomolecular film 4 produced in Example 2 was used to make an accumulated chemical adsorption film.

The production of such an accumulated chemical adsorption film was carried out in the following manner. The glass plate 1 carrying the chemical adsorption monomolecular film 4 was dipped and held for 3 minutes in a bath of ethanesulfonyl chloride which was at 40° C. in ambient air. As a result, the Cl atoms of the S—Cl groups in the ethanesulfonyl chloride reacted with the hydrogen atoms of the O—H groups in the chemical adsorption monolecular film 4 causing dehydrochlorination. A resultant chemical adsorption film expressed by Structural Formula 15 was accumulated over the existing chemical adsorption monomolecular film 4.

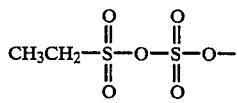

[Formula 15]

Figure 12:
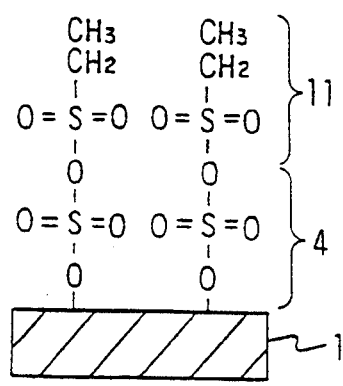
FIG. 12 is an enlarged sectional view of a chemical adsorption laminated film according to the embodiment of the present invention.

Then, the accumulated film was washed with chloroform for 3 minutes and with water for 3 minutes. Accordingly, the remaining or unreacted portion of the ethanesulfinyl chloride was removed and the accumulated chemical adsorption film 11 expressed by Formula 18 was developed and extended throughout the surface of the chemical adsorption monomolecular film 4 as shown in FIG. 12. The accumulated film 11 was securely bonded with the existing chemical adsorption monomolecular film 4 and found to be highly hydrophilic.

The accumulated film was examined by FT-IR spectrum analysis and it was found that its strength of adsorption is doubled at two wavelength points of 1440 and 1240 cm$^{-1}$. Also, the strength becomes nil at 3750 cm$^{-1}$ (attributed to O—H) but prominent about 2900 cm$^{-1}$ representing the existence of alkyl groups, so that accumulation is proved. Similar to Example 1, the duration of saturated adsorption in Example 9 was also examined, and it was found that the saturated adsorption was achieved in 3 minutes.

EXAMPLE 10

For accumulation of chemical adsorption films, the glass plate 1 of Example 4 was cleaned with an organic solvent and after dried out, and was dipped and held for 3 minutes in a bath of 1, 4-bis-(chlorosulfinyl)-butane which was at 40° C. in ambient air. As a result, the Cl atoms of the S—Cl groups in the 1, 4-bis-(chlorosulfinyl)-butane reacted with hydrogen atoms of the hydroxyl groups on the glass plate 1 causing dehydrochlorination. A resultant chemical adsorption film expressed by Structural Formula 16 was developed over the glass plate 1.

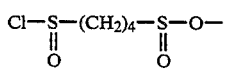

[Formula 16]

Figure 13:
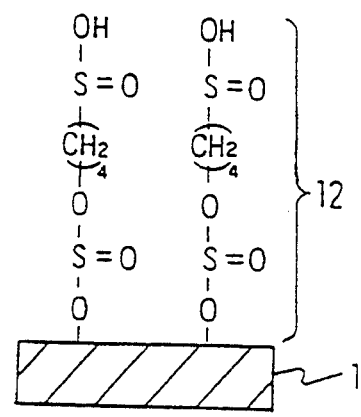
FIG. 13 is an enlarged sectional view of a chemical adsorption film according to the embodiment of the present invention.

Then, the film was washed with chloroform for 3 minutes and with water for 3 minutes. Accordingly, the film was shifted from Formula 16 to Formula 17, thus yielding a chemical adsorption monomolecular film 12 having at its surface hydroxyl groups as shown in FIG. 13. The monomolecular film 12 was securely bonded with the glass plate 1 and found to be highly hydrophilic.

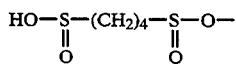

[Formula 17]

The monomolecular film was examined by FT-IR spectrum analysis and found it was found that its waveform exhibits desired characteristics at 3750 cm$^{-1}$ (attributed to O—H), 2920 cm$^{-1}$ (attributed to —CH$_2$—), 2850 cm$^{-1}$ (attributed to —CH$_2$—), 1440 cm$^{-1}$ (attributed to S—O), and 1240 cm$^{-1}$ (attributed to S=O).

Then, the production of the accumulated chemical adsorption film was carried out in the following manner. The glass plate 1 carrying the chemical adsorption monomolecular film 12 was immersed for 10 minutes in a bath of 1, 4-bis- (chlorosulfinyl)-butane which was at 40° C. in ambient air. As a result, the Cl atoms of the S—Cl groups in the 1, 4-bis-(chlorosulfinyl)-butane reacted with the hydrogen atoms of the O—H groups in the chemical adsorption monomolecular film 12 causing dehydrochlorination. A resultant chemical adsorption film expressed by Structural Formula 18 was accumulated over the existing chemical adsorption monomolecular film 12.

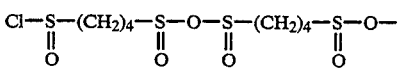

[Formula 18]

Figure 14:
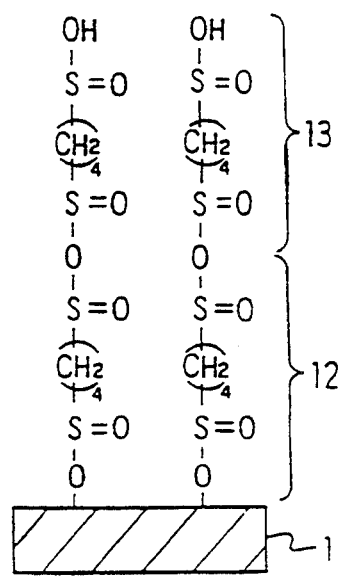
FIG. 14 is an enlarged sectional view of a chemical adsorption laminated film according to the embodiment of the present invention.

Then, the accumulated film was washed with chloroform for 3 minutes and with water for 3 minutes. Accordingly, the accumulated chemical adsorption film 12 was shifted from Formula 18 to Formula 19 thus yielding an accumulated chemical adsorption film 13 having at its surface hydroxyl groups as shown in FIG. 14. The accumulated film 13 was securely bonded with the existing chemical adsorption monomolecular film 12 and found to be highly hydrophilic.

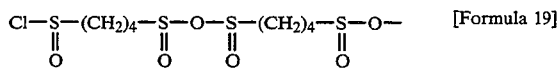

[Formula 19]

The accumulated film was examined by FT-IR spectrum analysis and it was found that its strength of absorption is doubled at four wavelength points of 2920, 2850, 1440 and 1240 cm$^{-1}$. Similar to Example 1, the duration of saturated adsorption in Example 10 was also examined and it was found that the saturated adsorption was achieved in 10 minutes.

EXAMPLE 11

The glass plate 1 carrying the accumulated chemical adsorption film 7 of Example 5 was immersed for 3 minutes in a bath of ethanesulfinyl chloride which was at 40° C. in ambient air. As a result, the Cl atoms of the S—Cl groups in the ethanesulfinyl chloride reacted with the hydrogen atoms of the O—H groups in the accumulated chemical adsorption film 7 causing dehydrochlorination. A resultant chemical adsorption film expressed by Structural Formula 20 was accumulated over the existing accumulated chemical adsorption film 7.

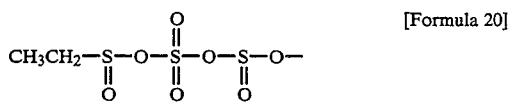

[Formula 20]

Figure 15:
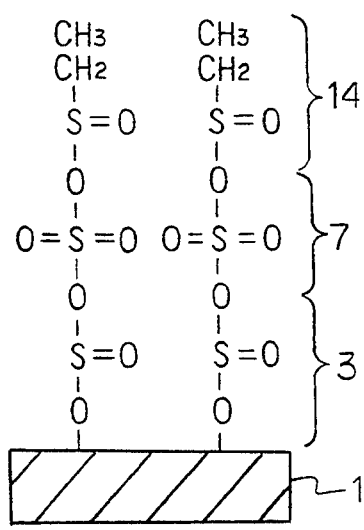
FIG. 15 is an enlarged sectional view of a chemical adsorption laminated film according to the embodiment of the present invention.

Then, the accumulated film was washed with chloroform for 3 minutes and with water for 3 minutes. Accordingly, the remaining or unreacted portion of ethanesulfinyl chloride was removed and an accumulated chemical adsorption film 14 expressed by Formula 20 was developed extending throughout the surface of the chemical adsorption film 7 as shown in FIG. 15. The accumulated film 14 was securely bonded with the existing chemical adsorption film 7 and found to be highly hydrophilic.

The accumulated film was examined by FT-IR spectrum analysis and it was found that its waveform exhibited desired characteristics at 2960 to 2840 cm$^{-1}$ (attributed to $CH_3$ and —$CH_2$—), 1440 cm$^{-1}$ (attributed to S—O), 1240 cm$^{-1}$ (attributed to S=O, O=S=O). Similar to Example 1, the duration of saturated adsorption in Example 11 was also examined and it was found that the saturated adsorption achieved in 3 minutes.

EXAMPLE 12

Figure 16:
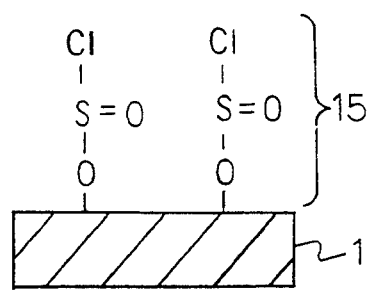
FIG. 16 is an enlarged sectional view of a chemical adsorption laminated film according to the embodiment of the present invention.

A glass plate 1 having active hydrogen atoms as shown in FIG. 1 was cleaned with an organic solvent and dried out. The plate was then dipped and held for 3 minutes in a bath of thionyl chloride which was at 40° C. in ambient air. As the result, the Cl atoms of the S—Cl groups in the thionyl chloride reacted with the hydrogen atoms of the hydroxyl groups 2 on the glass plate 1 causing dehydrochlorination. A resultant chemical adsorption monomolecular film 15 expressed by Structural Formula 21 was developed over the glass plate 1 as shown in FIG. 16.

[Formula 21]

Figure 17:
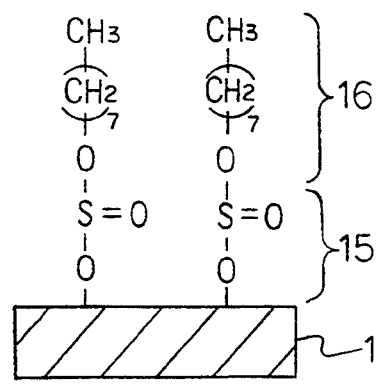
FIG. 17 is an enlarged sectional view of a chemical adsorption laminated film according to the embodiment of the present invention.

Then, the monomolecular film was washed with chloroform for 3 minutes and immersed for 10 minutes in a bath of 1-octanol which was at a temperature of 40° C. The film was further rinsed with methanol for 3 minutes and with water for 3 minutes. Accordingly, the chemical adsorption monomolecular film 15 was shifted from Formula 24 to Formula 25 yielding an accumulated chemical adsorption film 16 as shown in FIG. 17. This reaction resulted from dehydrochlorination between hydrogen atoms of the hydroxyl group in 1-butanol and the chlorine atoms in the chemical adsorption monomolecular film 15 of Formula 21 developed on the glass plate 1. As a result, S—O bonds were produced allowing the accumulated adsorption film 16 of Formula 22 to be securely bonded with the existing chemical adsorption monomolecular film 15 and to become highly hydrophilic.

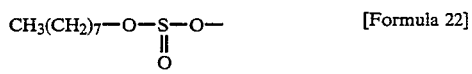

[Formula 22]

The accumulated film was examined by FT-IR spectrum analysis and it was found that its waveform exhibited desired characteristics at 2960 to 2840 cm$^{-1}$ (attributed to $CH_3$ and —$CH_2$—), 1440 cm$^{-1}$ (attributed to S—O), and 1240 cm$^{-1}$ (attributed to S=O). Similar to Example 1, the duration of saturated adsorption in Example 12 was also examined and it was found that the saturated adsorption was achieved in 10 minutes.

EXAMPLE 13

The glass plate 1 carrying the chemical adsorption monomolecular film 15, identical to that of Example 12, was used to make an accumulated chemical adsorption film.

Figure 18:
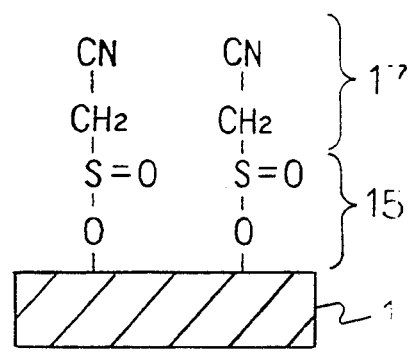
FIG. 18 is an enlarged sectional view of a chemical adsorption laminated film according to the embodiment of the present invention.
Figure 19:
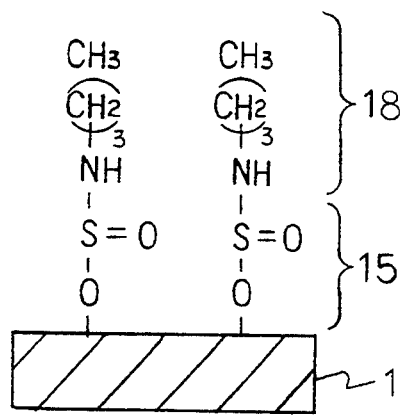
FIG. 19 is an enlarged primary part view of a chemical adsorption laminated film according to the embodiment of the present invention.

The production was carried out by the following method. The glass plate 1 with the chemical adsorption monomolecular film 15 was immersed for 10 minutes in a bath of acetonitrile which was at 40° C. After 3 minutes the plate was washed with methanol and rinsed with water for 3 minutes. A chemical adsorption accumulated film 17 expressed by Structural Formula 23 was developed on the entire surface of the chemical adsorption monomolecular film 15 as shown in FIG. 18. This reaction resulted from dehydrochlorination between the hydrogen atoms of the α-carbon group in acetonitrile and the chlorine atoms in the chemical adsorption monomolecular film 15. As a result, C—S bonds were produced allowing the accumulated adsorption film 17 to be securely bonded with the existing chemical adsorption monomolecular film 15.

[Formula 23]

The accumulated film was examined by FT-IR spectrum analysis at 2925 to 2860 cm$^1$ (attributed to —$CH_2$—), 2250 cm$^{-1}$ (attributed to C≡N), 1440 cm$^{-1}$ (attributed to S—O), and 1240 cm$^{-1}$ (attributed to S=O) which indicated the presence of the accumulated chemical adsorption film 17. Similar to Example 1, the duration of saturated adsorption in Example 13 was also examined and it was found that the saturated adsorption was achieved in 10 minutes.

Example 14

The glass plate 1 carrying the chemical adsorption monomolecular film 15, identical to that of Example 12, was used to produce an accumulated chemical adsorption accumulated film.

The production was carried out by the following method. The glass plate 1 with the chemical adsorption monomolecular film 15 was dipped and held for 10 minutes in a bath of n-butylamine which was at 40° C. After a 3-minute rinsing with methanol and a 3-minute washing with water, an accumulated chemical adsorption film 18 expressed by Structural Formula 24 was developed on the entire surface of the chemical adsorption monomolecular film 15 as shown in FIG. 18. This reaction resulted from dehydrochlorination between hydrogen atoms of the amino group in n-butylamine and the chlorine atoms in the chemical adsorption monomolecular film 15. As a result, the N—S bonds were produced allowing the accumulated adsorption film 18 to be securely bonded with the existing chemical adsorption monomolecular film 15.

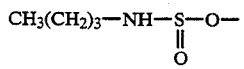

[Formula 24]

The accumulated film was examined by FT-IR spectrum analysis and it was found that its waveform exhibited desired characteristics at 3250 cm$^{-1}$ (attributed to N—H), 2925 to 2860 cm$^{-1}$ (attributed to —CH$_2$—), 1440 cm$^{-1}$ (attributed to S—O), and 1240 cm$^{-1}$ (attributed to S—O) which indicated the presence of the chemical adsorption accumulated film 18. Similar to Example 1, the duration of saturated adsorption in Example 14 was also examined and it was found that the saturated adsorption was achieved in 10 minutes.

Comparative Example 1

For comparison, a glass plate 1 identical to that of Example 1 was immersed for one hour under dry conditions in a bath of 10% by weight of a solution prepared by dissolving dichlorodimethylsilane, which serves as a chemical adsorbent, into a mixture of a solvent containing hexadecane and chloroform at a weight ratio of 4:1. After rinsing with chloroform and then, with water, a chemical adsorption monomolecular film expressed by Structural Formula 25 was developed on the glassplate 1.

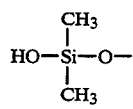

[Formula 25]

Then, the glass plate 1 carrying the chemical adsorption monomolecular film was immersed in a bath of 10% by weight of a solution prepared by dissolving methyl-trichlorosilane, which serves as a chemical adsorbent, into a mixture of a solvent containing hexadecane and chloroform at a weight ratio of 4:1. After washing with chloroform and then with water under dry conditions, an accumulated chemical adsorption film expressed by Structural Formula 26 was produced.

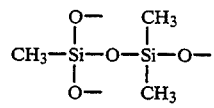

[Formula 26]

The accumulated film was examined by FT-IR spectrum analysis and it was found that the measurement at 3750 cm$^{-1}$ (attributed to O—H) was eliminated while there was a waveform increase at 1080 cm$^{-1}$ (attributed to Si—O). Also, the duration of saturated adsorption in Comparison 1 took as long as one hour.

The two advantages are confirmed by comparing Examples 4 to 14 with Comparative example 1 as follows;

(1) The immersion action of the present invention to accumulate the chemical adsorption films can be executed under standard atmospheric conditions as compared with the strictly dry atmosphere required in conventional methods using the chlorosilane surface-active agent, thus easing the entire procedure.

(2) The adsorption action of the present invention to accumulate the chemical adsorption films can be conducted at a faster rate than conventional methods using a chlorosilane surface-active agent, thus increasing the reacting efficiency from 6 to 20 times. In more detail, the St-Cl groups of the chlorosilane surface-active agent used in conventional methods is highly reactive with hydrogen atoms of the O—H groups of the substrate surface and thus, care should be taken for handling the agent. The chemical adsorbent employed for producing an accumulated chemical adsorption film in the method of the present invention is less reactive than the chlorosilane surface-active agent and can be handled with much ease. Also, its reactivity can be easily enhanced by increasing the temperature of the immersion step. In fact, the adsorption speed was much increased during the experimental actions.

Although it is preferred that the chemical adsorption monomolecular film or the accumulated film is bonded by covalent S-bonds, it is not limiting and other chemical layers or films, e.g. an St-bonded chemical adsorption or accumulated film, a chemical adsorption non-monomolecular film, a Langmuir-Blodgett film, an accumulated Langmuir-Blodgett film, and a common polymer film produced by a casting, spin coating, or fusion injection method, will be securely bonded with equal success.

It is understood that the present invention is not limited to the S—Cl bonds of the embodiment and S—Br or S—I bonds can be successfully used for accumulating chemical adsorption films by S-bonds.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A chemically adsorbed monomolecular film comprising a monomolecular film adsorbed to a substrate surface by covalent S-bonds, wherein the monomolecular film is a Langmuir-Blodgett film, a chemical adsorption film or an accumulated chemical adsorption film and wherein the monomolecular film is adsorbed to the substrate surface by bonding molecules having at one end a halosulfinyl group of the formula —(S=O)—X or a halosulfonyl group of the formula —(O=S=S)—X.

2. The chemically adsorbed monomolecular film according to claim 1, wherein said monomolecular film comprises a laminated film which is adsorbed to said monomolecular film by covalent S-bonds.

3. The chemically adsorbed monomolecular film according to claim 1 or 2, wherein said substrate is selected from the group consisting of metal, ceramic, plastic, glass, paper, and wood.

4. The chemically adsorbed monomolecular film according to claim 2, wherein said covalent bond is selected from the group consisting of —(S=O)— and —(O=S=O)—.

5. The chemically adsorbed monomolecular film according to claim 1 or 2, wherein said S-bonds are selected from the group consisting of A—(S—O)— and A—(O=S=O)— where A represents alkyl, alkylene, alkoxyl, or a substituted group.

* * * * *